United States Patent [19]
Cosier et al.

[11] 3,990,255
[45] Nov. 9, 1976

[54] APPARATUS FOR SECURING CABLE

[75] Inventors: James Edwin Henry Cosier; Peter David Jenkins, both of London, England

[73] Assignee: The Post Office, London, England

[22] Filed: July 18, 1975

[21] Appl. No.: 596,991

[52] U.S. Cl. .................................... 61/114; 24/6; 294/66 R
[51] Int. Cl.² .......................................... F16L 1/00
[58] Field of Search .................. 61/72.3, 63, 72.1; 294/66; 24/6

[56] References Cited
UNITED STATES PATENTS

| | | | |
|---|---|---|---|
| 3,129,030 | 4/1964 | Brockbank et al. | 294/66 R |
| 3,319,426 | 5/1967 | Slonczewski | 61/72.3 |

*Primary Examiner*—Jacob Shapiro

[57] ABSTRACT

The securing of cable, and particularly the securing of laid light weight submarine telephone cable during repair operations, is difficult in that if the cable is merely gripped it tends to fillet and slip away. The invention seeks to overcome this problem by belaying a bight of the cable about an axis thus to secure the cable generally in the manner of a rope upon a windlass. Apparatus embodying the invention may be drawn over ground supporting the cable, in the manner of a trawl, with flukes ploughing the ground. When the apparatus crosses the path of the cable to be secured, the cable is ploughed up and guided into a lateral line, triggering an hydraulic circuit to cause an axially mounted spool to rotate and belay the bight of cable by wrapping the cable upon the spool. A second hydraulic circuit is then activated to cause the cable to be severed on one side of the spool axis and clamped on the other side, whereupon the secured section of cable can be raised for repair. Various states of the apparatus can be signalled to a towing vessel by sonar, and the apparatus is arranged to be usable in each of two relatively inverted positions.

11 Claims, 11 Drawing Figures

APPARATUS FOR SECURING CABLE

The invention relates to securing cable and in particular to securing lightweight submarine telephone cable.

Lightweight submarine telephone cable is used only for ocean crossings where the depth of water is greater than about 500 fathoms. As that depth the cable requires no armouring since the shallower water hazards of trawling, dragging anchors and fierce currents do not exist. Furthermore, some little additional protection is afforded by the generally oozy nature of the ground below the water, into which the cable tends to sink without encountering the sharp edges sometimes prevalent in shallower waters. Submarine cable is essentially a very simple structure so in these deep locations it can be expected to function satisfactorily for many years.

However, it will be understood that cable will generally be laid only in a deep location when the total length of cable is great, an example being the transatlantic cable known as Cantat 2. In such cases repeaters must be placed at intervals in the length of the cable to boost the transmitted signals, and because the repeaters are necessarily complex they are liable to fail. In deep water it is at present not feasible to repair or replace a repeater in situ so if a repeater fails the cable adjacent the repeater must be located, brought to the surface with the repeater, and a new repeater with a bridging length of cable inserted. A problem in this operation is that it is economically advantageous to lay the cable initially as tightly as possible and Cantat 2, for instance, has only 3 percent slack over its length, so even if the cable were made strong enough to support its own weight when lifted far from the ground the very tightness of the cable would prevent it being raised to the surface without being broken.

Thus repair of the cable requires the steps of:

a. locating the fault;
b. locating and securing the cable adjacent the fault;
c. severing the cable;
d. raising one severed end to the surface;
e. raising the other severed end to the surface;
f. cutting out the section of the cable containing the fault;
g. joining the severed ends with a new length of cable, which will generally include a new repeater; and
h. releasing the repaired cable to allow it to return to the ground.

The location of faults in telephone cable can be done electronically and is not part of the present invention which is, rather, particularly concerned with the problem of securing the cable so that it may be raised to the surface.

One kind of apparatus for raising cable has been available for many years. This is the so-called Lucas grapnel. This grapnel is drawn over the ground until it engages the cable, using a grappling rope extending to a surface vessel. When the grapnel is engaged with the cable is has to be lifted more or less vertically so that the cable enters a holding mechanism comprising an arrangement of levers which is operated by the increase in grappling rope tension when the cable is lifted from the ground. The cable is severed in a similar way and one cut end can then be raised to the surface. It is then necessary to locate and raise the other end. Apart from the problem of raising the grapnel vertically, another drawback with the Lucas grapnel is that it merely grips the outer surface of the cable and if the operation is attempted with cable which is not armoured (that is, the kind of cable which is used in deep water locations) there is a tendency for the cable sheath to be stripped from the core so that the engaged end is lost - a failure known as filletting. The essential strength of lightweight cable lies in a core which nowadays is usually a rope of high tensile steel, the adhesion between this rope and the various layers under the cable sheath (at least over the relatively short length which can be held in the Lucas grapnel) being relatively small and certainly less than the tension liable to arise in cable lifted to the surface.

The present invention seeks to transmit the lifting forces to the cable core by belaying a bight of the cable about an axis.

Thus, according to the invention there is provided apparatus for securing cable comprising:

a frame;
locating means on the frame engageable with the cable to locate said cable on a line extending laterally across the frame;
a spool mounted for rotation about a longitudinal axis;
drive means actuable to drive the spool forwards about said axis;
belaying means projecting from the spool to sweep across said line when the spool is driven; and
reaction means operative on the spool to resist backward movement thereof;
whereby in use the sweeping movement of the belaying means causes it to pick up cable located on said line and belay a bight of said cable about said axis.

The apparatus may conveniently include means such as a screw thread mounting said spool for driven movement simultaneously about and along said axis, and the belaying means comprise two diametrically opposed hooks each pointing generally forwards.

It will be appreciated that the apparatus is particularly applicable to the securing of laid submarine cable and accordingly it is preferred that the apparatus be adapted to be drawn over ground to secure cable supported thereby by including ground-engageable ploughing means projecting from the frame to plough the ground when the apparatus is drawn thereover and a guideway extending from the ploughing means towards the locating means. In use, this preferred form of the apparatus is drawn over the ground, across the path of the laid cable, causing the cable to be ploughed up and guided into its required line of location across the frame.

There may be ploughing means and a guideway on each of two opposed faces of the frame, so that the apparatus is alternatively operable in each of two relatively inverted positions. It is convenient too, to have the drive means actuable by a trigger located in the or each guideway to be operated by guided cable.

As stated previously, laid cable will normally have to be severed to be brought to the surface and accordingly it is preferred that the apparatus include a blade operable to sever secured cable on one side of the spool axis, and to avoid this severance allowing release of the cable from the apparatus may include a clamp operable to clamp secured cable on the other side of said axis.

There may be two similar clamp and blade members mounted on the frame at opposite sides of the spool axis, each said member comprising a clamp extending towards one face of the frame and a blade extending towards the other face and being selectively invertible, said two members being relatively inverted.

It is possible that both ends of severed cable could be raised to the surface at the same time, or that a remaining end could be marked with a buoy or similar indicator, and for this purpose there may be a pair of sets of the aforedefined apparatus, said pair comprising two said sets interconnected at a joint and means operable to release the interconnection.

The invention extends to a system, including the apparatus, for securing laid submarine cable, said apparatus having a plurality of states respectively defined by operation of various parts thereof, and the system including signalling means operative to transmit a plurality of signals each uniquely representing one of said states. Such signalling means may comprise a fixed-pitch transmitter operative to pulse the transmitted sound at a repetition frequency unique to the signalled state, the system including a hydrophonic receiver for said sound.

The invention will now be described by way of example with reference to the accompanying drawings in which.

Figure 1:
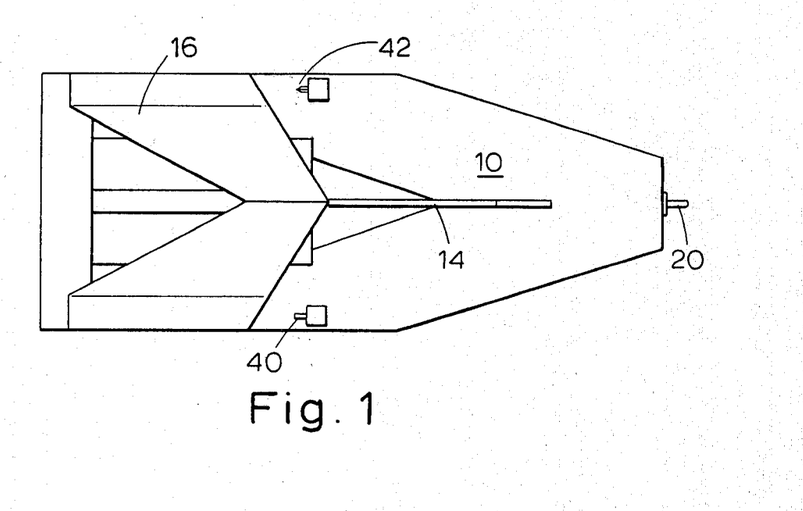
FIG. 1 is a schematic plan view of apparatus for securing submarine cable which embodies the invention.
Figure 2:
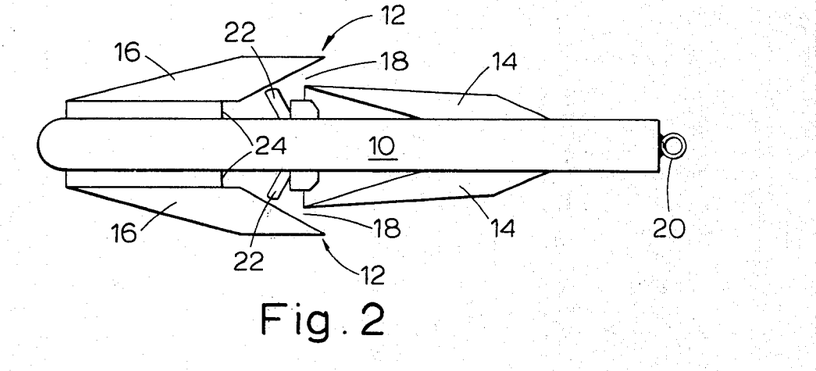
FIG. 2 is a schematic side elevation corresponding to FIG. 1.
Figure 3:
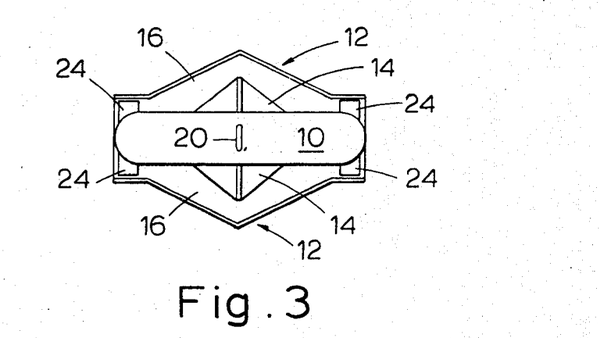
FIG. 3 is a schematic end elevation corresponding to FIGS. 1 and 2 and showing the apparatus viewed from a front end.

Referring firstly to FIGS. 1 to 3, these show apparatus including a frame 10. The frame 10 carries two similar opposed ploughing means each indicated generally at 12 and comprising a share 14 and a fluke 16 with an open guideway 18 therebetween. A towing eye 20 is mounted at one end of the frame 10 (the front end) and a trigger 22 is located in each guideway 18. Each fluke 16 is bifurcated towards the sides of the frame 10. At the aft ends of the guideway 18, and at each side of the frame 10, are shoulders 24 defining location means.

The apparatus is particularly intended for use in securing laid lightweight submarine telephone cable by being drawn over the ground supporting the cable, and it will be noted that the apparatus will be stable in each of two relatively inverted positions, that is with one or the other ploughing means engaging the ground.

The apparatus has an overall length of about 10 ft, a width of about 3.5 ft. and a height of about 2.5 ft.

When the apparatus is drawn over the ground to secure laid cable the lower ploughing means 12 will be in engagement with the ground. The apparatus is drawn across the known path of the laid cable and when the cable is encountered it will be ploughed up by the ploughing means and guided through the lower guideway 18 to the lower location means 24. During its passage through the lower guideway 18 the cable will operatively trip the lower trigger 22 to set the apparatus into operation, as will be described in more detail hereinafter. The lower share 14 serves both to stabilise the apparatus on the ground and to reduce the possibility of a trigger being inadvertently tripped by an unexpected obstacle encountered by the apparatus as it is drawn over the ground.

Figure 4:
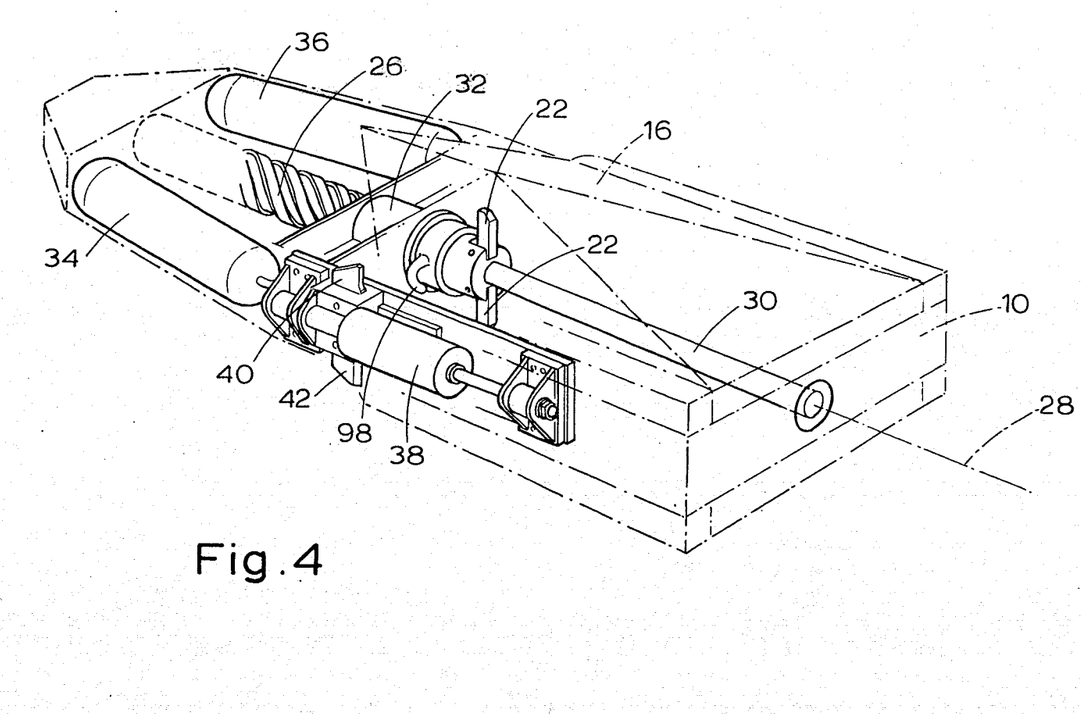
FIG. 4 is a schematic isometric view of the apparatus with some hidden detail revealed.

Referring now to FIG. 4, the frame 10 is shown to carry a spool 26 mounted for rotation about a longitudinal axis 28. The axis 28 is defined by a shaft 30 and each trigger 22 is pivotally connected to the aft end of the spool 26 so that, in the position illustrated, each trigger is located in its associated guideway 18 (not shown in FIG. 4). The spool 26 is formed with a coarse external screw thread engaged in a captive nut 32 mounted in the frame 10 so that the spool will rotate if it moves along the axis 28. The spool 26 is formed as a hollow cylinder associated with a piston on the shaft 30 and hydraulic fluid from a first accumulator 34 is arranged to be admitted to the cylinder when a trigger 22 is tripped, to cause the spool 26 to be driven along the axis 28 by hydraulic pressure. At the same time, of course, the spool 26 will be caused to rotate by the nut 32. When the spool 26 nears the aft end of the shaft 30 it operates a valve to admit hydraulic fluid from a second accumulator 36 to two cylinders 38 mounted one at each side of the frame 10. Only one of the cylinders 38 is visible in FIG. 4 but each is associated with a clamp 40 and an oppositely directed blade 42 so that when the cylinders 38 are charged from the accumulator 36 each clamp and blade 42 is driven towards an associated shoulder 24. The clamp 40 and blade 42 together make up a common member having a clamp and a blade respectively directed towards opposite faces of the frame 10 and the arrangement is such that the two clamp and blade members are relatively inverted at opposite sides of the axis 28, so that whereas the blade 42 visible in FIG. 4 is directed downwards the hidden blade 42 at the other side of the axis 28 is directed upwards. Similarly, the visible clamp 40 in FIG. 4 is directed upwards whilst the hidden clamp 40 at the other side of the axis 28 is directed downwards. Thus, at opposite sides of the axis 28, there is a downwardly directed blade and a downwardly directed clamp, and when the cylinders 38 are charged cable located against the lower shoulder 16 will be severed on one side of the axis 28 by the downwardly directed blade 42 and will be clamped on the other side of the axis 28 by the downwardly directed clamp 40. It will be appreciated that the same operation will take place if the apparatus is inverted from the position shown in FIG. 4, and it should be pointed out that each clamp and blade member can be inverted in the frame so that the cable can be severed on a predetermined side.

Figure 5:
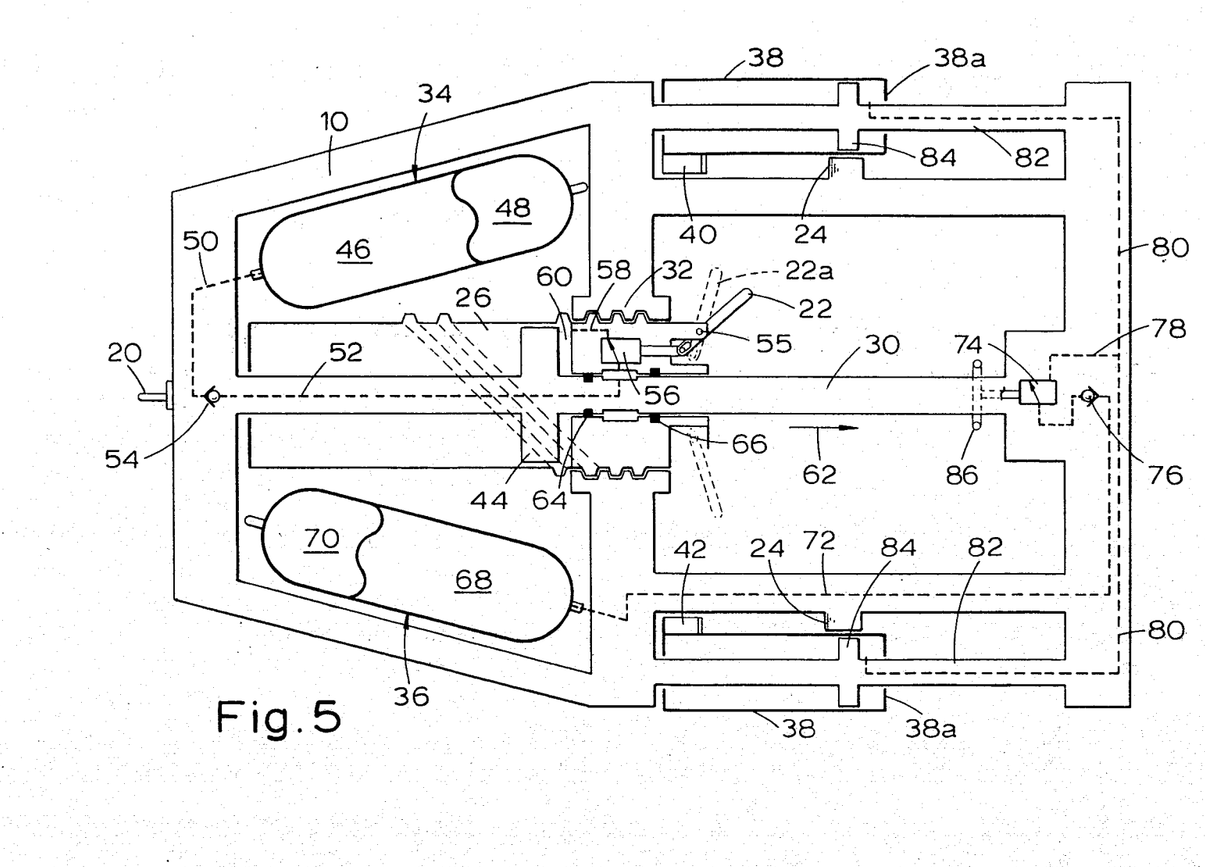
FIG. 5 is a diagrammatic representation of hydraulic drive means of the apparatus.

The hydraulic circuit of the apparatus, and its operation, will now be described with reference to FIG. 5 wherein the spool 26 is shown to be in the form of a hollow cylinder associated with a piston 44 on the shaft 30. Hydraulic fluid 46 in the first accumulator 34 is pressurised by nitrogen, indicated at 48, and a pressure line 50 connects the accumulator 34 to a passage 52 in the shaft 30 by way of a one-way valve 54. As shown in FIG. 5, one trigger 22 has been moved (from its preset position indicated in broken lines at 22a) about its pivotal connection 55 to the spool 26. This tripping of the trigger 22 has opened a previously closed valve 58 to admit hydraulic fluid from the passage 52 to a further passage 58 leading to a chamber 60 which is formed to one side to the piston 44 by the piston 44 and the cylinder formed within the spool 26. Thus the chamber 60 is pressurised from the first accumulator 34 and by reaction against the piston 44, which is fixed, the spool 26 is driven along the shaft 30 in the direction of arrow 62.

The cylinder space to the other side of the piston 44 is sealed to contain air, initially at atmospheric pressure but progressively compressed by the longitudinal movement of the spool 26. A sealing ring 64 prevents leakage of hydraulic fluid into the chamber 60 when valve 56 is closed and a further sealing ring 66 prevents leakage, initially from passage 52 and subsequently from the chamber 60 when it is pressurised, and ingress of sea water. As the spool 26 is moved along the shaft 30 it is caused to rotate by interengagement of the mating screw threads on the spool 26 and the fixed nut 32.

The second accumulator 36 also contains hydraulic fluid pressurised by nitrogen, the hydraulic fluid being indicated at 68 and the nitrogen at 70. A fluid line 72 extends from the second accumulator 36 to a valve 74 by way of a one-way valve 76 and a fluid line 78 connects the valve 74 to two lines 80 extending to the cylinders 38. Each cylinder 38 has mounted thereupon a member comprising a clamp 40 and a blade 42 as hereinbefore described with reference to FIG. 4. (For the sake of simplicity, one clamp and blade member only is shown in FIG. 5). Further, each cylinder 38 is mounted for sliding movement upon a fixed piston rod 82 carrying a piston 84 which co-operates with the associated cylinder 38.

With the apparatus in a position as in FIG. 5 the valve 74 is, as shown, closed. When the moving spool 26 nears the aft end of the shaft 30 it engages a striker 86 which opens the valve 74 and allows pressurised hydraulic fluid from the second accumulator 36 to enter each cylinder 38 by way of fluid lines 72, 78 and 80 and valves 76 and 74. Thus each cylinder 38 is charged with pressurised hydraulic fluid in the space between the piston 84 and the cylinder head 38a, so that each cylinder 38 is driven along its associated piston rod 82 (to the right as seen in FIG. 5), compressing the sealed-in air on the other side of the piston. In this way each clamp 40 and blade 42 is driven towards its associated shoulder 24, and cable located against the shoulder 24 is accordingly clamped on one side of the frame 10 and severed on the other side.

It will be noted that the one-way valve 54 will prevent reverse flow of hydraulic fluid back to the accumulator 34. Thus there will be a reaction against any tendency for the spool 26 to move backwards and accordingly, provided the spool 26 reaches the aft end of shaft 34, it will be held there. Similarly, the cylinders 38 and their associated clamps 40 and blades 42 will be held in an actuated state by the effect of one-way valve 76.

The way in which the apparatus may be used to secure the blade submarine cable will now be described with particular reference to FIGS. 6 to 11.

Figure 6:
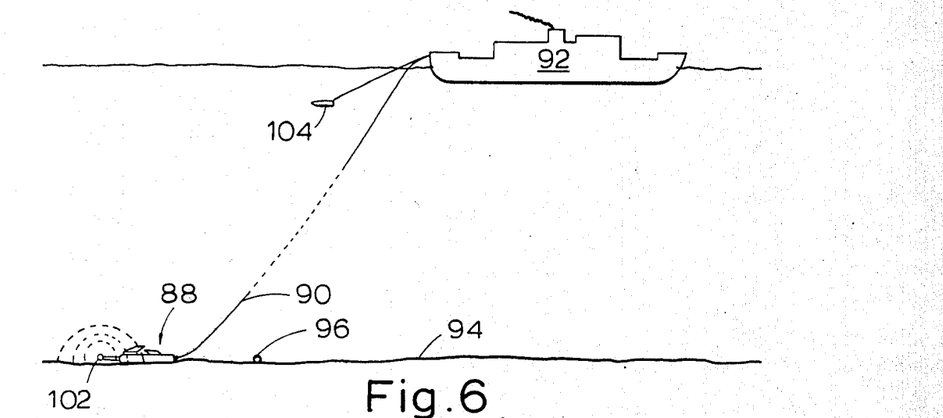
FIG. 6 is a schematic representation of the apparatus is use.

FIG. 6 which is not to scale, for the sake of clarity, shows the apparatus indicated generally at 88. The apparatus 88 is connected by a grappling rope 90 to a surface vessel 92 which is sailing to draw the apparatus 88 over the ground 94 so as to cross the path of ground-supported cable 96. When the apparatus 88 reaches the cable 96, the cable 96 will be ploughed up and guided into a required line across the apparatus in a manner to be understood from the foregoing description and particularly FIGS. 1 to 3. As the cable 96 is guided into said line it will trigger operation of the apparatus.

FIGS. 7 to 11 illustrate various stages in the operation of the apparatus and each shows the apparatus viewed from the underside, for clarity. The reference numerals of FIGS. 7 to 11 correspond to those of the aforedescribed Figures wherever appropriate.

Figure 7:
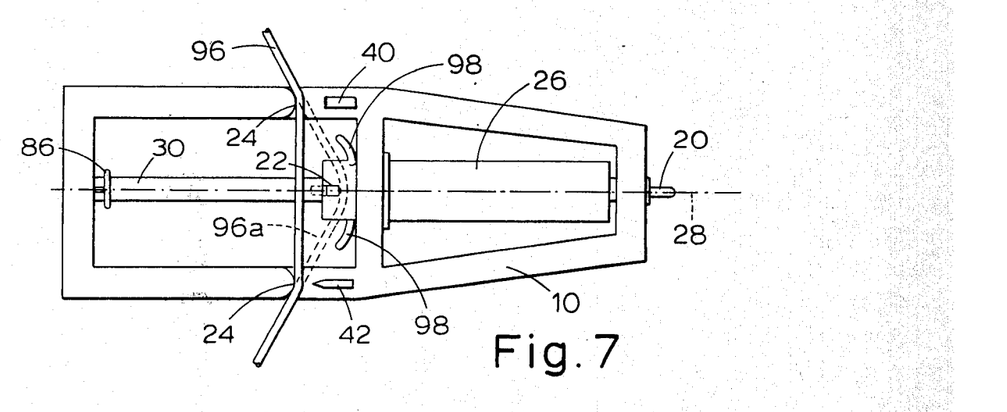
FIGS. 7 to 11 are schematic plan views illustrating various stages in the operation of the apparatus.
Figure 9:
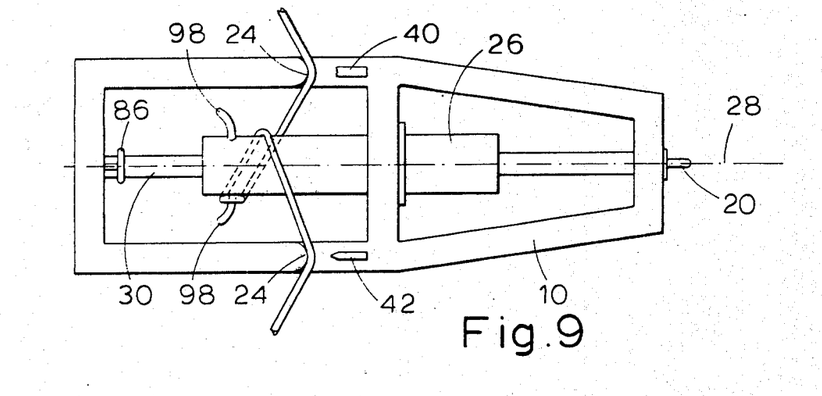
Figure 10:
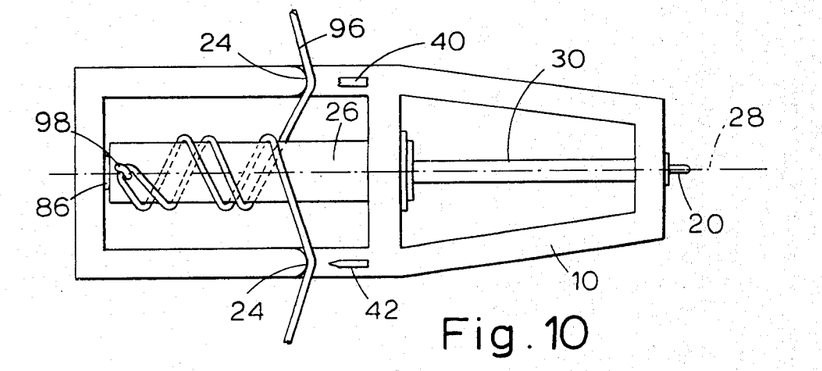

As shown clearly in FIGS. 7, 9 and 10, the spool 26 mounted on the shaft 30 is provided with belaying means in the form of two opposed, upstanding hooks 98. One hook 98 is visible also in FIG. 4. Each hook 98 points generally forwards.

FIG. 7 shows the apparatus in a first state in which the spool 26 is at one extreme of its permissible movement. The spool 26 is about to be driven towards the aft end of the apparatus since the cable 96, in passing through a guideway 18 (FIG. 2) has tripped trigger 22. The instant of the cable's contact with trigger 22 is indicated in broken lines at 96a. Tripping of the trigger 22 has initiated charging of the chamber within the spool 26 but the spool 26 has not yet started to move. The cable 96 has continued to pass through a guideway 18 from the position indicated at 96a to that indicated at 96b where it is located by the shoulders 24 in a line extending transversely across the frame 10.

Figure 8:
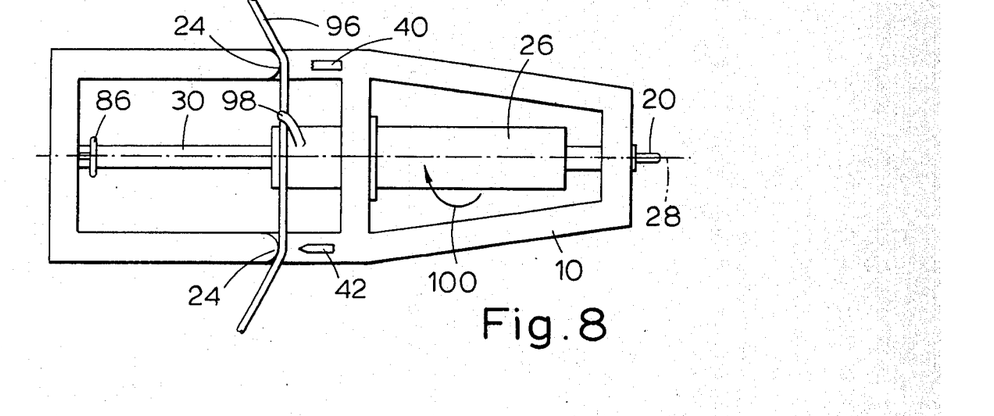

FIG. 8 shows the apparatus when the spool 26 has moved a short distance. This movement of the spool 26, which herein is termed a forward movement, is indicated by arrow 100. It will be noted that the movement of the spool 26 is simultaneously along and about its axis 28, so that each hook 98 sweeps a generally helical passage from its first position as shown in FIG. 7. This helical sweeping movement of the hooks 98 crosses the fixed line of located cable 96 so that one or other of the hooks 96 will, as it crosses that line, pick up the located cable 96 and carry it forward. FIG. 8 shows the apparatus at an instant where one hook is about to pick up the cable and FIG. 9 a subsequent stage where it has carried the cable forwards. After picking up the cable 96, the hook 98 continues to move forward, forming a bight in the cable 96, the cable 96 being drawn inwards past the shoulders 24 to be wrapped in generally helical form on the spool 26. Thus a bight of cable 96 is belayed about the axis 28.

The spool 26 continues to move forwards, wrapping the bight of cable 96 about itself, until it reaches the striker 86. The apparatus is now in a second state, shown in FIG. 10, in which the bight of cable 96 has been belayed about the axis 28 and striker 86 has been depressed to effect movement of the clamps 40 and blades 42 in a manner to be understood from the foregoing description with reference to FIG. 5. As depicted in FIG. 10, the clamp and blade members have not yet started to move towards their associated shoulders 24.

Figure 11:
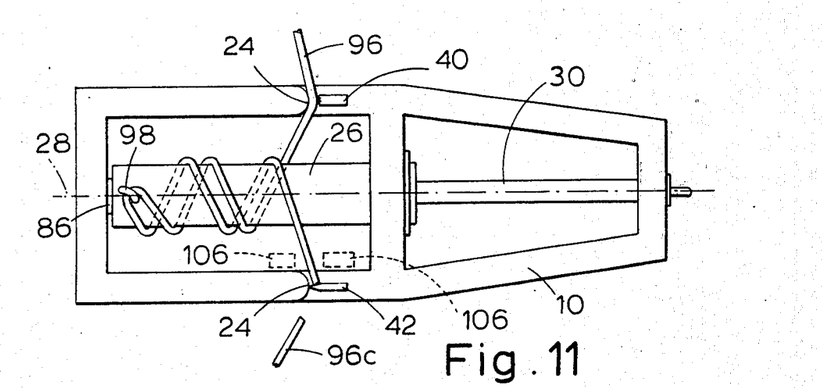

FIG. 11 shows the third and final state of the apparatus, the illustrated clamp 40 and blade 42 have been driven towards their respective shoulders to clamp the cable 96 on one side of the axis 28 and to sever the cable on the other side of the axis 28. One end of the cable 96 may now be raised to the surface by drawing in the grappling rope 90 (FIG. 6), that end of cable being retained upon the spool 26 in the manner of a rope upon a windlass. With that end of cable 96 raised to the surface, the free end 96c may be secured and raised by repeating the aforedescribed sequence of operations.

For the sake of clarity, the ploughing means of the apparatus is not shown in any of FIGS. 7 to 11 but it will be understood that the apparatus will be stable when drawn over the ground in each of two relatively inverted positions. Thus, although FIGS. 7 to 11 have been referred to as showing the underside of the apparatus, this underside may be either of the two faces of the frame from which the ploughing means project.

The invention has been described with reference to the securing of submarine cable and for this purpose it is preferred that there be provision for signalling the state of the apparatus to the surface vessel which tows it. Details of suitable signalling means are not shown in the accompanying drawings, it being considered that those skilled in the art will be well able to construct an apt arrangement, but the elements of one such arrangement are outlined in FIG. 6. The arrangement comprises a matched transmitter and receiver operating on the sonar principle. Mounted on the apparatus 88 is a transmitter 102 operative to transmit sound at fixed pitch through the water to a receiver in a hydrophone 104 towed behind the surface vessel 92. The transmitter 102 is associated with sensors, not shown, which sense the relative positions of the various moving parts of the apparatus 88 so that the transmitter 102 is caused to pulse the transmitted sound at a repetition frequency determined by the state of the apparatus 88. With apparatus 88 in its first state, that is, when it is being drawn towards the cable 96 with the cylinder in the spool 26 not yet charged, the transmitter 102 pulses the sound at a first repetition frequency to produce a "ping" characteristic of the first state of the apparatus 88. When one of the triggers 22 is tripped the transmitter 102 is caused to change the pulsing of the sound to a second repetition frequency unique to this second state of the apparatus. Similarly, a third repetition frequency signals operation of the clamp and blade members, when the apparatus 88 is in a third state.

The sound signals received at the hydrophone 104 are monitored on the surface vessel 92. As the apparatus 88 approaches the cable 96 the first repetition frequency is heard. As the cable 96 is guided into the required line across the frame of the apparatus 88, the sound heard changes to the second repetition frequency, instructing the crew of the vessel 92 to pay out the grappling rope 90 so that the cable 96 is not dragged excessively off its laid path by the momentum of the vessel 92. When the clamp and laid members have operated the third repetition frequency is heard and the crew of the vessel 92 know that the secured end of the cable 96 can be raised to the surface.

When the apparatus 88 is being drawn over the ground the normal length of grappling rope 90 is some one and half times the depth of the water, and for particularly deep locations a transponder may be located about mid-way along the grappling rope 90 to boost the signals transmitted from the transmitter 102 to the hydrophone 104.

If the cable is to be properly secured, of course, the drive means must generate sufficient motive force to wind the bight of cable onto the spool 26. Furthermore, the tension in the cable must not be allowed to become excessive. The apparatus described as the spool of diameter about 8 in. and has an external screw thread of 14 in. pitch. Tests have shown that, with the stiffest lightweight submarine cable currently in use, the torque required to wind the cable onto the spool is approximately 3,000 lbf. ft. The tension in the cable will not exceed 1,000 lbf. Taking the coefficient of friction between the screw thread and its mating nut as 0.15, the torque available from the drive means is 4,075 lbf. ft. per 1,000 lbf. in.$^{-2}$. The first accumulator is charged to 5,000 lbf. in.$^{-2}$ and this pressure will drop to 2,000 lbf. in.$^{-2}$ by the time that the spool has completed its movement to the aft end of the apparatus. Thus the initial torque produced will be greater than 20,000 lbf. ft. and the final torque, at the end of the spool's forward movement, will be greater than 8,000 lbf. ft. It follows that there is always a considerable safety margin between the torque available and the torque required, even allowing for compression of the air sealed within the cylinder, which reaches a pressure of only about 150 lbf. in.$^{-2}$ at the end of the spool movement.

Whilst the question of winding torque is most prominent with the stiffest cable, the possibility of slippage of cable from the spool is greater with more flexible cable. Tests have shown, however, that provided two complete turns of the bight are wound onto the spool the slipage will be negligible even when the slackest cable is pulled with a force of 16,000 lbf. This arises both from the well-known gripping action of a belay having several turns (each complete turn of the bight in this case giving effectively two turns of cable about the spool 26) and from the sharp deformation of the cable about that hook 98 with which it is engaged. Thus it has been found unnecessary to grip the severed end of the secured cable, although grips 106 (FIG. 11) may be provided.

The second accumulator 36 is initially charged to 3,000 lbf. in.$^{-2}$, the pressure dropping to about 2,000 lbf. in.$^{-2}$ when both clamp and blade members reach the end of their travel. The dimensions of the clamp and blade operating cylinders 38 are chosen to give a minimum thrust of 30,000 lbf., which is sufficient for the appropriate blade to sever the cable on one side of the apparatus frame.

As stated previously, the apparatus is especially intended for use in deep water (below 500 fathoms) and accordingly it would be possible to use hydrostatic drive means to replace one or each of the arrangements of accumulators 34 and 36. However, if the surrounding water were itself used as the operating medium of the necessary hydraulic circuits, it would be necessary to filter it carefully to remove abrasive particles. Furthermore, even if an hydraulic fluid such as oil were used as the operating medium, pressurised by the surrounding water, it would be necessary to regulate the available pressure (perhaps 10,000 lbf. in.$^{-2}$) to controllable values, since otherwise the apparatus would need to be unduly massive to withstand the consequent stresses.

Modifications to and optional features of the apparatus will not be appreciated by those skilled in the art, but certain possibilities should be mentioned here. Firstly to secure both cut ends of the cable simultaneously, or perhaps to mark one end thereof, a pair of sets of the apparatus could be used, interconnected at a joint with means provided to release the interconnection so that the pair splits into two. One set, by remaining engaged with the free end 96c (FIG. 11) of the cable could be arranged to release some indicator such as a marker buoy, so as to make the free end easily located when the other end has been raised. If it were sought to raise both ends at the same time, allowance would have to be made for the increasingly wide separation of the two ends as these are brought up.

It should also be mentioned that, although the apparatus has been described as operating automatically when cable is engaged, it would be possible to arrange that the apparatus signal the towing vessel when cable is engaged, a return signal then being used to actuate the apparatus.

It is possible that, in some circumstances, the reaction between the spool 26 and the cable 96 when the cable is raised could become so great as to cause excessively high pressure in the hydraulic system on one side of the one-way valve 54. Some mechanical means may therefore be provided to replace or supplement the reactive effect of the valve 54. Such means could comprise a ratchet mechanism, a ratchet wheel being secured to the front end of the spool 26 in engagement with a spring-biased and pivotable pawl bar extending alongside the spool 26 so as to remain in engagement with the ratchet wheel as the spool moves and to prevent backward movement of the spool.

Other modifications will be apparent to those skilled in the art.

What is claimed is:

1. Apparatus for securing cable comprising:
   a frame;
   locating means on the frame engagable with the cable to locate said cable on a line extending laterally across the frame;
   a spool carried by said frame and mounted for movement along and rotation about a longitudinal axis;
   drive means carried by said frame and actuable to drive the spool forwards along and rotationally about said axis;
   delaying means projecting from the spool to sweep across said line when the spool is driven;
   reaction means operative on the spool to resist backward movement thereof;
   whereby in use the sweeping movement of the belaying means causes it to pick up cable located on said line and belay a bight of said cable about said axis.

2. Apparatus as claimed in claim 1 including screw means mounting said spool for driven movement simultaneously about and along said axis.

3. Apparatus as claimed in claim 2 wherein the belaying means comprises two diametrically opposed hooks each pointing generally forwards.

4. Apparatus as claimed in claim 1 and adapted to be drawn over ground to secure cable supported thereby, said apparatus including: ground-engageable ploughing means projecting from the frame to plough the ground when the apparatus is drawn thereover and a guideway extending from the ploughing means towards the locating means; whereby in use drawing the apparatus over the ground, across the path of said cable, causes the cable to be ploughed up and guided into its line of location across the frame.

5. Apparatus as claimed in claim 4 including a said ploughing means and guideway on each of two opposed faces of said frame, whereby the apparatus is alternatively operable in each of two relatively inverted positions.

6. Apparatus as claimed in claim 4 wherein the drive means is actuable by a trigger located in said guideway to be operated by guided cable.

7. Apparatus as claimed in claim 4 and including a blade operable to sever belayed cable on one side of the spool axis.

8. Apparatus as claimed in claim 7 including a clamp operable to clamp belayed cable on the other side of said axis.

9. Apparatus as claimed in claim 8 comprising two similar clamp and blade members mounted on the frame at opposite sides of said axis, each said member comprising a said clamp extending towards one face of the frame and a said blade extending towards the other face and being selectively invertible, said two members being relatively inverted.

10. A system for securing laid submarine cable including apparatus as claimed in claim 4, which apparatus has a plurality of states respectively defined by operation of various parts thereof, and signalling means operative to transmit a plurality of signals each uniquely representing one of said states.

11. A system as claimed in claim 10 wherein the signalling means comprises a fixed-pitch sound transmitter operative to pulse the transmitted sound at a repetition frequency unique to the signalled state, said system including a hydrophonic receiver for said sound.

* * * * *